Aug. 28, 1956
F. E. BUYKEN
2,760,297
CRAB TRAP
Filed June 18, 1951
3 Sheets-Sheet 1
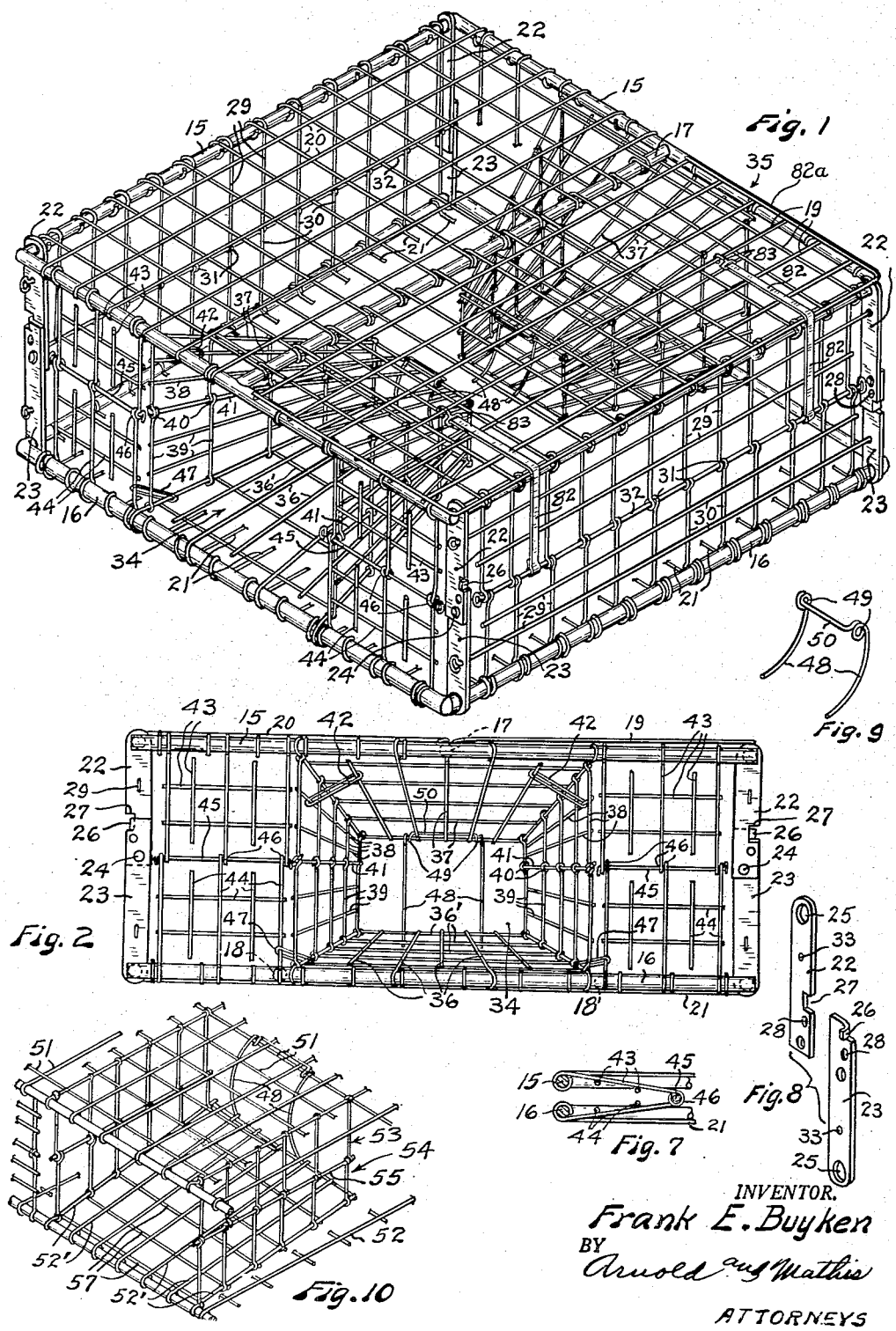
INVENTOR.
Frank E. Buyken
BY
Arnold and Mathis
ATTORNEYS Aug. 28, 1956 F. E. BUYKEN 2,760,297
CRAB TRAP
Filed June 18, 1951 3 Sheets-Sheet 2
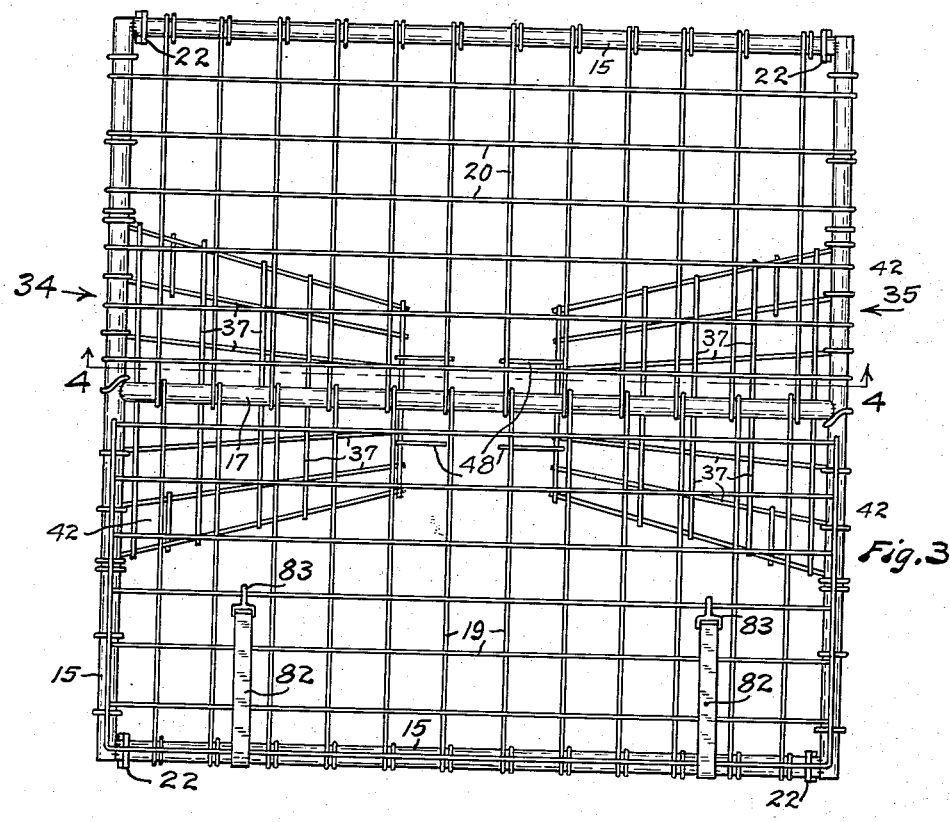
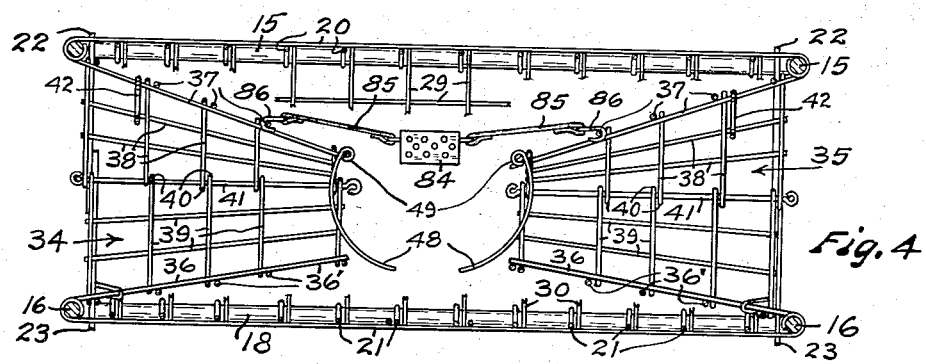
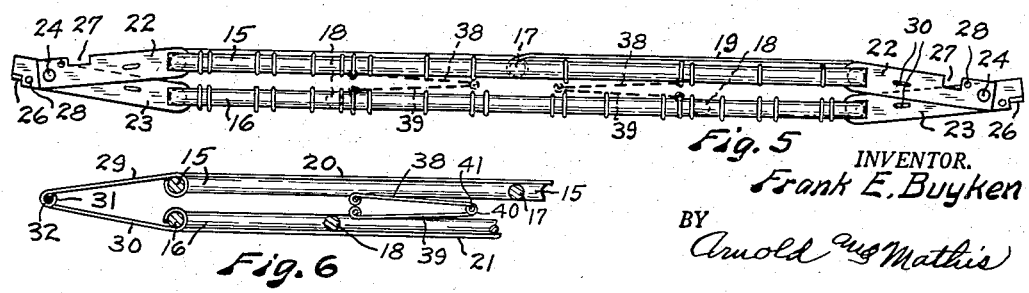
INVENTOR.
Frank E. Buyken
BY
Arnold and Mathis
ATTORNEYS Aug. 28, 1956 F. E. BUYKEN 2,760,297
CRAB TRAP
Filed June 18, 1951 3 Sheets-Sheet 3

INVENTOR.
Frank E. Buyken
BY Arnold and Mathis
ATTORNEYS

United States Patent Office 2,760,297
Patented Aug. 28, 1956

2,760,297

CRAB TRAP

Frank E. Buyken, Seattle, Wash.

Application June 18, 1951, Serial No. 232,149

4 Claims. (Cl. 43—105)

My invention relates to a trap for taking seafood life of the Crustacea species, order Decapoda, sub-order Brachyura, including crabs and lobsters.

More particularly, my invention relates to a trap which eliminates the disadvantages inherent in the crab trap of common practice design and use, and particularly as relates to the floor of the entrance tunnel.

The common practice heretofore has been to construct these crab traps of rigid rectangular or circular frames covered with netting which is of considerable pliability. Entrance passageways, called tunnels, are provided leading towards the center of the trap, the floor of which tunnels slopes upwardly to a swinging gate which opens readily inwardly but is blocked against outward swinging. The netting, including that portion forming the floor of the tunnel, is of small wire gauge, such as .032 gauge, and the mesh is of diamond form with sides of one of the angles of the mesh converging in the direction of ingress. The crabs crawl up the tunnel floor and are supported thereon in direct contact while so entering. Traps of such construction long have been subject to criticism. Many of the crabs caught are mutilated in that many of the crabs so taken have lost an appendage, such as a claw or a limb. This reduces them to culls as a matter of grading for pricing. Hence, a missing appendage, claw or limb, is of serious economic importance because a crab so mutilated is graded at a lower price in the market, i. e., the price of a cull.

Just what was the cause of this difficulty was not known. For a long time past the same standard character of traps has been employed despite difficulties as set forth. Crabs and lobsters for many years past have been known to provide a nutritious article of food supplying many valuable minerals, and hence are in great demand. Thus crabs constitute a valuable product of the sea.

Further objection obtains to the common trapping gear in view of the fact that it must be loaded on the limited space of the deck of a fishing vessel and carried sometimes for a distance of two hundred miles to the fishing location at sea, and during a part of this route may be exposed to heavy seas which subjects the cargo on deck to the risk of being damaged or lost. Therefore, the number of such non-foldable crab traps transported is very much limited.

A primary purpose of my invention is to provide a trap which will overcome these several and serious objections. As the traps are disposed for the most part in deep water when set to catch the crabs, and disposed among the seaweed so that direct observation is almost impossible, there was presented a distinct problem in the discovery of what was causing the difficulty. After extended study of the problem, I have made certain discoveries which I believe to be the explanation of the difficulties, and I have discovered the methods and means of overcoming the same. For purposes of definiteness and clearness of disclosure, I will set forth my invention as it relates to the taking of crabs. However, it is to be understood the invention is not to be limited to any such specific use but extends to all cases where like conditions exist in whole or in part.

My discovery, among other features, comprises the fact that the appendages (legs and claws) of the crab become caught in the wire mesh, especially the mesh forming the floor of the tunnel over which the crabs crawl in entering the trap. This tunnel floor slopes upwardly and supports the crabs and is directly contacted by them while entering by crawling thereover. I have found that the crabs try to press their way through this tunnel passageway in trying to reach the bait within the trap. It appears that the bait excites and induces a race, as it were, between the crabs to reach the bait. More particularly, it is the joints of the appendages which are of a character to receive the small gauged wire commonly used to form the mesh of the trap of the common construction. This wire, according to common design and use, is of such small size that it readily enters the joints of the legs or claws so that they become caught and held against entrance.

In the meantime, they block or obstruct the entrance of other crabs during the period of struggling to free themselves. In this connection, it is important to remember a feature which has long been known to characterize the crab. It has the power when frustrated in freeing itself of letting go of its limb and growing another. Thus, while the crab is held back against its desire to reach the bait, in due course it will free itself by letting go of the claw or injure itself and thereby become a cull.

Also, I have discovered that the ordinary mesh employed in traps as heretofore constructed, being of the diamond shape and having the coverging wire of the mesh forming an acute angle with the wire converging in the direction of entrance of the crabs, results in the acute angle forming a jaw-like snare in which the limbs or appendages of the crab become tightly caught. Also, I have discovered that at the joints of the crab there is a small bone extension which points forwardly away from the body of the crab and seems to assist the wire of the mesh becoming ensnared in the soft part of the joint. When a crab thus becomes ensnared it tugs and pulls in the direction of entering the trap and this causes the acute angle of the wire mesh to become distorted and causes the acute angle to become even less than it was before, and thereby more tightly to hold the crab appendage.

As a result of my invention and discovery, the crabs are caught in an efficient manner. My trap achieves this advantage and does so practically without culls, or at least with very few culls.

One of the difficulties in providing a proper crab trap is that it must be constructed with open mesh work and of as large mesh as possible in order to prevent seaweed and other vegetable growth in the sea from clogging the trap. Furthermore, the mesh must be as open as possible to prevent the eddying of the currents and thereby the depositing of sand which would promptly bury traps and render them quite impossible to be pulled up by the ordinary gear. Furthermore, such construction must take into account the action of storms which break the traps loose from their moorings and scatter them about the sea floor so that they may not be recoverable, particularly when they become embedded in sand. This emphasizes the importance of having open mesh work so that the sand may be washed through the trap and the trap does not seriously impede the current to make it drop the sand in and over the trap. It is a common experience that after a storm, such of the traps of common practice design as are discovered at low tide are so buried in the sand that often they require to be pulled loose by the use of horses.

I have discovered that by constructing the tunnel floor of mesh having wide angles and of stiff non-distortable small rod construction in place of pliable wires, a type of entrance is provided which meets the peculiar characteristics of the crabs' crawling habits. Such construction characterising my invention permits the crab to enter the trap even in the mad rush speedily without being hindered by having its appendages becoming ensnared in the mesh of the netting.

A very advantageous feature, according to my discovery, is that the mesh of the netting should not be distortable by the strength of the crab. This feature combined with a rod forming the mesh of a size which does not easily enter the joints of the crab characterizes my invention.

Accordingly, my discovery, among other considerations, involves the following: If the angle of the mesh of the structure forming the floor of the tunnel is of a wide angle measured in the direction of ingress, then the size of the wire is of less consequence and some of the advantages of my discovery will be provided in part even when a small wire of a size .032 (the size employed in common practice) is used. The "wide angle" formed by the converging sides in such case might be of the order of 60°. Thus, if the said angle of the mesh is not of such small degree that the limb becomes engaged, then the small wire can be employed without so much of the disadvantage of the present trap.

If instead of a small wire, the stiff rod form of my invention, of relatively large diameter such as one-eighth of an inch, is used, then the size of the rod itself contributes largely to the non-snaring of the limb of the crab by reasons of its not entering the joint even though the angle of mesh be converging and of the order of not less than 60° to 70°. The size of the rod itself not only prevents the entering of the rod into the joint, but particularly does such structure prove beneficial in that the stiff rod-like structure prevents the mesh becoming distorted and the angle rendered less than 60° by the crab while struggling to free itself. Thus the advantages of my invention and discovery can be gained or secured when only one or more of said features are employed, as the character and size of the angle or the rod construction for the mesh. However, the full advantages of my invention may be gained by combining the various features which characterize the same.

My invention, furthermore, results in a greatly reduced period of filling the trap and thereby provides for the return of the fishing vessels with their load in a much shorter time than is now commonly required.

Thus, all the factors, collapsible construction, wideness of angle form of wire mesh, and employment of rods of a stiffness which prevents their being distorted in forming the mesh, are all involved in providing a trap of the most efficient form of my invention.

The primary purpose of my invention is to provide such efficient trap and one which will meet all of these conditions although the employment of one or more of such factors will achieve the advantages of my invention to the extent that the same are used.

The above-mentioned general objects of my invention, together with others inherent in the same, are attained by the device illustrated in the following drawings, throughout which like reference numerals indicate like parts:

Figure 1 is an isometric view, with parts omitted, of a trap constructed in accordance with my invention;

Fig. 2 is an end view of the same showing one of the tunnels;

Fig. 3 is a plan view of said crab trap;

Fig. 4 is a view of the same partly in section and partly in elevation taken substantially on broken line 4—4 of Fig. 3, parts being omitted, and a bait box, which is omitted from the other figures, being shown in said Fig. 4;

Fig. 5 is an end view, with parts omitted and parts diagrammatically illustrated, showing this trap in a folded position;

Fig. 6 is a fragmentary view partly in section and partly in elevation and with parts omitted illustrating the manner in which a side and tunnel of this trap fold when the trap is collapsed;

Fig. 7 is another fragmentary view, partly in section and partly in elevation and with parts omitted, showing how end sections of the trap fold when the trap is collapsed;

Fig. 8 is a detached exploded perspective view of two folding links of a type used to connect the top and bottom portions of the trap at each of the four corners;

Fig. 9 is a detached perspective view of a wire guard used like a trap door at the inner end of each tunnel to prevent crabs, or the like, which have entered the trap from escaping through these tunnels;

Fig. 10 is a fragmentary isometric view showing a modified form of trap having a tunnel which is of approximately equal width from end to end and in which the top wall of the tunnel is formed by the top of the trap;

Figure 11:
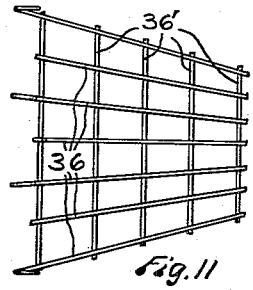
Fig. 11 is a detached plan view showing the runway or passageway floor of one of the entrance tunnels of the trap illustrated in Figs. 1 to 10 inclusive, having the rods extending in wide angles formed by the rods extending substantially parallel to the sides of the tunnel.

This trap comprises an upper rectangular frame or top 15 and a lower rectangular frame or bottom 16. Preferably, a medial cross bar 17 is rigid with and extends across the upper frame 15 and two spaced apart iron bars 18 are rigid with and extend across the lower frame 16. Preferably, the frame parts 15 to 18 inclusive are solid iron bars and these frame parts provide desirable weight to help sink the trap in water and to help hold it immovable when it is in the water.

The cross bar 17 divides the top frame 15 into two halves. A door type closure member 82a formed of crossed rods 19 is hinged to the cross bar 17 so that it can be opened to provide access to the interior of the trap. This door formed by rods 19 can be wired or tied to the frame 15 to hold it closed. Preferably, the crossed rods of the top and bottom and side walls of the trap extend approximately at right angles to each other.

Elastic straps 82 may be secured to the sides of the trap and drawn upwardly over the door type closure member formed by rods 19 and fastened by means of hooks 83 which engage with the rods 19 so that the straps hold the closure members in closed position.

The other half of the upper frame 15 preferably has a permanently attached closure formed by two sets of relatively crossed rods 20. The end portions of the rods 20 can be attached to the frame members 15 by bending them around said frame members. Welding can be used to secure the crossed rods to each other and to the frame members wherever desired throughout the construction of this trap.

The lower rectangular frame 16 carries permanently attached mesh preferably formed of two sets of relatively crossed rods 21 which extend across said frame 16 and have their ends secured thereto. The two sets of relatively crossed rods 21 may be positioned substantially at right angles to each other.

The upper frame 15 and lower frame 16 have their four corner portions connected with each other by four sets or pairs of pivotally connected folding links. As these sets of links preferably are of duplicate construction, the following description will apply equally well to any of the four sets. Each set of said folding links comprises two flat metal link members 22 and 23 pivotally connected with each other by a pivot member 24. The end portion of each link 22 and 23 remote from the pivot member 24 is provided with a relatively large opening 25 which is fitted over and pivotally mounted on a bar of the frame 15 or 16. The frames 15 and 16 are preferably each made by welding together a plurality of bars and the links 22 and 23 are preferably placed on predetermined frame bars before the bars of the frame are welded together. One link member 23 of each set has an end portion which extends a substantial distance beyond its pivot point 24 and which is provided with a transversely extending stop member 26. The other link member 22 of the set has a notch 27 in one edge thereof to receive the stop member 26. The stop member 26 prevents folding or jack-knifing of the two links in an inward direction beyond the position in which they are shown in Fig. 2, but allows each pair of links to fold outwardly into a position such as that shown in Fig. 5 when the trap is collapsed. Obviously, the mechanical construction of this means for stopping relative angular movement of the links 22 and 23 may be varied. Preferably, a hole 28 is provided in each link 22 and 23 and these holes 28 are positioned so that when the links 22 and 23 are in an extended position, as shown in Figs. 1 and 2, the said holes 28 in the two links will register with each other so that a bolt or pin, not shown, can be inserted in these holes to prevent folding of said links and collapse of the trap.

Preferably, the stop means 26, 27 is arranged so as to allow the pivot member 24 to pass inwardly a short distance beyond a straight line common to the axes on which the outer end portions or holes 25 of the links are pivoted. This provides a structure which can be readily collapsed manually, but which will not collapse by reason of its own weight. Preferably the distance from the pivot member 24 to the center of the hole 25 of each link is the same to facilitate compact folding of the trap.

For the purpose of this description, the portions of the trap shown at the right and left in Fig. 3 are herein termed the ends of said trap, and the portions shown at the top and bottom of Fig. 3 are herein termed the sides. The links 22 and 23 are pivoted on frame bars 15 at the sides of the trap.

The mesh which forms each side of the trap is composed of an upper section of crossed rods 29 and a lower section of crossed rods 30. Each upper side section formed by rods 29 has its upper edge portion pivoted to the adjacent bar of the upper frame 15. Each lower side section formed by rods 30 has its lower edge portion pivoted to the adjacent bar of the lower frame 16. These pivotal connections can be made by bending the vertical rods of these side sections around the side bars of the frames 15 and 16. The adjacent edges of each pair of side sections formed by rods 29 and 30 are pivotally connected with each other, as by forming in the end portions of the vertical rods 29 and 30, loops 31 which extend around a common pivot rod 32. The pivot rod 32 is disposed substantially in axial alignment with the pivot members 24 of the adjacent pairs of links 22 and 23. Preferably, at least one of the horizontal rods of each side section extends through holes 33 in the links 22 and 23, see Figs. 1 and 8, so that the side sections formed by rods 29 and 30 are connected with the links 22 and 23 and will move synchronously therewith in collapsing and opening up the trap.

Two inlet or entrance tunnels of duplicate construction, and which are indicated generally by numerals 34 and 35, extend inwardly from opposite ends of the trap. Each of the tunnels shown in Figs. 1 to 6 inclusive comprises a bottom member or runway formed of relatively crossed longitudinal rods 36 and transverse rods 36', a top member similarly formed of crossed rods 37, and two side members each consisting of an upper section formed of crossed rods 39. All of the walls of the tunnels 34 and 35 converge from the outer to the inner ends of said tunnels so that, at the inner end portion of each tunnel, the bottom member or runway of the tunnel formed by the bottom crossed rods 36 and 36' is elevated above the bottom of the trap. In a like manner, the inner end portion of the top member of the tunnel, formed by the top crossed rods 37, is spaced below the plane of the top of the trap. The mesh, particularly of the entrance tunnel, is of a size which provides for confining legal sized crabs, and the mesh is angularly disposed with the sides forming a wide angle, the sides diverging in a direction opposite to the direction of entrance of the crab into the trap. This is a most important arrangement in that it provides for eliminating a converging angle between the mesh which contributes to the crab having its joints catch in the mesh due to its angle, and prevents it readily freeing itself so as to be able to pass on into the trap. Also the size of the rods in my invention are such as to not readily enter the joint of the crab. The very small gauge wire commonly employed in the netting ordinarily used in the construction of the traps may readily enter the joints of the legs or claws of the crab and thereby so engage the crab to delay his entering, and thereby greatly lessen the efficiency of the trap. The size or gauge of the rods is preferably not less than about one-eighth of an inch in diameter and the angles at which the rods intersect or cross are such that acute angles are avoided to as great an extent as possible and the angles of the intersecting or crossed rods preferably may not vary greatly from right angles but may be about 60°.

The two sections which cooperate to form each side of each tunnel are pivotally connected with the adjoining edge portions of the top member and bottom member of the tunnel. Also, the adjoining edge portions of each pair of side sections of each tunnel are pivotally connected with each other as by forming on the end portions of vertical rods of said side sections, see Fig. 4, loops 40 through which a common pivot rod 41 extends. Preferably, the pivot rods 41 are in substantially the same plane as the pivot rods 32 to facilitate collapse of the trap.

Some of the rods 36 which form the bottom of each tunnel are bent around the adjacent end bar of the lower frame 16 to pivotally connect the tunnel bottom to this end bar. Similarly, some of the rods 37 which form the top of each tunnel are bent around the adjacent end bar of the upper frame 15 to pivotally connect the top member of the tunnel to the end bar.

The features herein set forth as characterizing the tunnel construction make it possible for my invention to provide a foldable crab trap having collapsible tunnels which are limited in certain operations to insure their folding only when so desired and to insure their being permitted to unfold to the desired degree. This folding, it is to be remembered, is to be provided for a mechanism to be exposed to corroding and the general attack of salt water.

Preferably, a wire loop 42 shaped like an elongated chain link, see particularly Fig. 2, is provided at each upper corner portion of each tunnel 34 and 35 to limit outward pivotal movement of the side members of the tunnels, and to cause said side members to fold inwardly when the trap is collapsed. One end portion of each loop 42 extends around one of the rods 37 which form the tunnel top and the other end of said loop extends around one of the rods 38 which form the adjacent upper side section of the tunnel.

The tunnels 34 and 35 preferably are positioned midway between the two sides of the trap and the end portions of the trap at the sides of the tunnels are closed by suitable end members, each consisting of an upper section formed of crossed rods 43 and a lower section formed of crossed rods 44. Each upper end section formed of rods 43 is pivotally connected with the adjacent end bar of the upper frame 15 and each lower end section formed of rods 44 is similarly pivotally connected with the adjacent end bar of the lower frame 16. The adjacent edges of the two end sections of each pair are pivotally connected with each other, as by a pivot rod 45, which extends through eye members 46 formed in the end portions of some of the vertical rods 43 and 44. Each pair of end sections formed by rods 43 and 44 is adapted to fold inwardly in the manner illustrated in Fig. 7, when the trap is collapsed. Preferably, a loop 47, similar to loop 42, see Fig. 2, extends around and connects one rod 44 of each lower end section with an adjacent rod 36 of the tunnel in such a manner as to prevent the two end sections of each pair from folding outwardly and to insure the inward folding of the two end sections.

To prevent crabs which have entered the trap from escaping through the tunnels 34 and 35, I preferably provide at the inner end of each tunnel a swingingly mounted tunnel guard comprising spaced apart curved rods 48. Preferably, each pair of rods 48 has eye portions 49 formed therein and the said eye portions 49 are connected by a cross bar portion 50. The eye portions 49 are pivotally supported on the innermost cross rod 37 of each tunnel and the convex sides of the rods 48 are directed toward the tunnel.

The tunnel guards 48, 49 and 50 normally hang in the positions best shown in Fig. 4 and can be freely moved pivotally away from the inner ends of the tunnels by the crabs as the crabs enter the trap. If crabs start to leave the trap by way of the tunnels, these guards 48, 49 and 50 will block their exit. The guards 48, 49 and 50 are prevented from interfering with the folding or collapsing of the trap of reason of their form and mounting.

When the trap is collapsed or folded, as shown in Figs. 5, 6 and 7, it can be quickly and easily set up by exerting a lift on the top frame 15 whereupon the folded sides and ends and tunnels and corner links will be straightened out into the positions shown in Figs. 1, 2 and 4, and said parts may be held in these positions by inserting pins or keys not shown in the holes 28 of the links 22 and 23. The trap can be as easily collapsed by removing the keys or pins from the holes 28 and moving the links 22 and 23 outwardly far enough so the pivots 24 pass center whereupon all parts of the trap will collapse or fold into a flat compact package.

In collapsing the trap, the links 22 and 23 and sides 29 and 30 fold outwardly as shown in Figs. 5 and 6, and the sides 38 and 39 of the tunnels and end sections 43 and 44 of the trap fold inwardly as shown in Figs. 5, 6 and 7. The links 42 and 47 prevent the sides 38 and 39 of the tunnels and the end sections 43 and 44 from folding outwardly.

When the strap is in use, preferably a perforated bait box 84, Fig. 4, having bait such as live clams therein, is suspended between the two inner end portions of the entrance tunnels 34 and 35. This bait box may be so suspended by means of two elastic straps 85, each provided with a hook 86 to hook onto rods 37 of the respective tunnels. The water in and about the trap becomes affected by the clam juice and hence the crabs are attracted and induced to seek entrance into the trap.

In the modified form of the tunnel shown in Fig. 10, the top rods 51 of the trap form the top of the tunnel and relatively crossed rods 52', which are spaced above the bottom rods 52 of the trap and are inclined upwardly from the outer to the inner end of the tunnel, form the bottom or runway of the tunnel. Also, the sides of the tunnel shown in Fig. 10 are substantially parallel and do not converge and each of said sides comprises an upper section 53 and a lower section 54 which are pivotally connected with each other by a pivot rod 55. The uppermost edge portions of the upper sections 53 are pivotally connected with top rods 51 of the trap and the lowermost edge portions of the lower side sections 54 are pivotally connected with the bottom rods 52' of the tunnel. The sides of the tunnel shown in Fig. 10 fold inwardly similarly to the sides of the tunnels 34 and 35 of Figs. 1 to 9 inclusive when the trap is collapsed.

In the runway floor or passageway of the tunnel shown in Fig. 10, the longitudinal rods 52' of said floor are substantially parallel and intersect or cross the transverse rods 57 substantially at right angles.

In the runway or passageway floor of the tunnel shown in Fig. 11, the longitudinal rods 36 of the runway floor converge, but the angles of intersection of the longitudinal rods 36 and transverse rods 36' do not vary from right angles, that is, wide angles, enough so that the crabs will get the joint portions of their appendages (legs or claws) caught between the intersecting rods.

Figure 12:
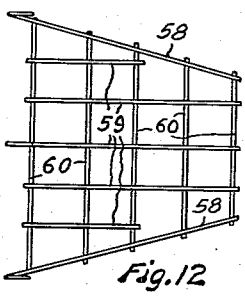
Fig. 12 is a plan view of a further modified form of the floor of the tunnel with the rods disposed at a wide angle to each other without regard to converging with the sides of the tunnel.

In the runway floor, shown in Fig. 12, the longitudinal side rods 58 converge and the remaining longitudinal rods 59 are parallel to the longitudinal axis of the tunnel and intersect the cross rods 60 substantially at right angles, thus providing wide angles of intersection.

Figure 13:
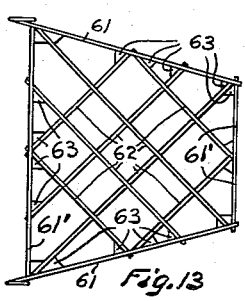
Fig. 13 is a plan view of a still further modified form of the floor of the tunnel with the rods disposed at wide angles to each other and running diagonally of the axis of the tunnel.

The runway floor, shown in Fig. 13, comprises convergent side rods 61 and two sets of diagonal rods 62 which intersect and cross each other substantially at right angles. The acute angles formed at the locations where the diagonal rods 62 intersect, the side rods 61 and transverse front and rear end rods 61' are preferably filled by gusset members 63 which may be welded in place and which fill in the spaces between the several rods where acute angles occur. At any rate, when it is remembered that the crab crawls sidewise, it is obvious that the intersecting rods nearest the sides of the floor do not present the same danger of snaring the appendages as do those located more centrally of the tunnel.

These gusset members 63, filling the corners of mesh forming boundaries, insure against the crustacea having their appendages ensnared by the angle of the members forming the mesh. Thus, even angles of less than 60° may be employed (see Fig. 13 where 45° angles are illustrated) when the small angles are supplied with gussets to prevent snaring the appendages of the crustacea, for example, the crab. Also, the gusset operates to prevent the mesh from being distorted and the angle formed by the mesh reduced. That is, the gusset functions to reinforce the members forming the angle of the mesh. This gusset may be of greater thickness than the members forming the boundaries of the mesh and thus may function, in addition to reinforcing, also by reason of its greater size, to avoid entering the joint of the appendage of the crustacea.

Figure 14:
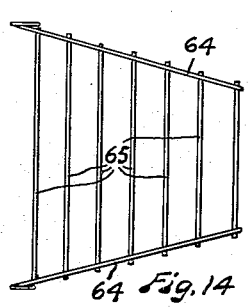
Fig. 14 is a plan view of another modified form of the floor of the tunnel with the rods extending at right angles to the axis of the floor and without the rods extending longitudinally of the tunnel.

The runway floor, shown in Fig. 14, comprises convergent side rods 64 and parallel cross rods 65 disposed at right angles to the tunnel longitudinal axis. The rods 65 are close enough together and sufficiently stiff so that no crabs which are large enough to be legally taken can get out of the trap between them. If desired, a medial longitudinal rod, such as the medial longitudinal rod shown in Fig. 11, obviously could be caused to be welded to each of the rods 65 for strengthening purposes.

Figure 15:
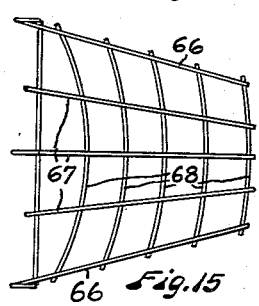
Fig. 15 is a plan view of another modified form of the floor of the tunnel with the rods radiating from a common center longitudinally and with the cross members disposed in arcs concave in the direction of entrance.

The runway floor, shown in Fig. 15, comprises convergent side rods 66, other convergent longitudinal rods 67, and concavely curved cross rods 68, all arranged so as to avoid forming undesirably acute angles, or positively stated, to provide intersections of wide or larger angles.

Figure 16:
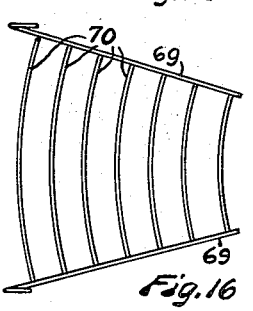
Fig. 16 is a plan view of a modified form of the floor of the tunnel with the rods transversely disposed and convexly inclined with respect to the direction of entrance.

The runway floor, shown in Fig. 16, comprises convergent side rods 69 and curved cross rods 70. The curved cross rods 70 are positioned so that they are convex toward the wider end portions of the runway floor. When they are so arranged, the curved cross rods 70 intersect the convergent side rods 69 substantially at right angles and acute angles are entirely done away with. No longitudinal rods except the convergent side rods 69 are shown in Fig. 16, but it will be obvious that one or more rods like the rods 67 of Fig. 15 can be provided at spaced intervals between the convergent side rods 69, and that all of these rods can intersect the curved cross rods 70 at right angles.

Figure 17:
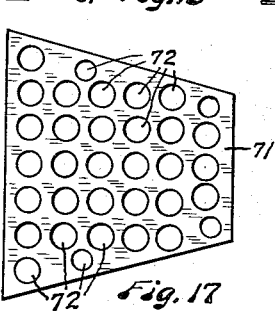
Fig. 17 is a plan view of a still further modified form of the floor of the tunnel having circular openings as a means of providing wide angles.

Fig. 17 shows an entrance tunnel runway floor 71 which is made of sheet metal having a plurality of perforations 72 therein. This floor 71 is free from acute angles in which crabs can get their legs or claws caught, but is more liable to become loaded with drifting sand or plant growth than are the runway floors which are made of fabricated metal rods.

These modified forms show various ways in which wide angle intersections of the rods in the tunnel floor may be provided to avoid catching the appendages of the crabs. In fact, the form shown in Fig. 17 may be said to avoid all acute angles. It will be understood that the crabs are supported by the tunnel floor and this floor is directly contacted by the crabs while they are crawling thereover.

Figure 18:
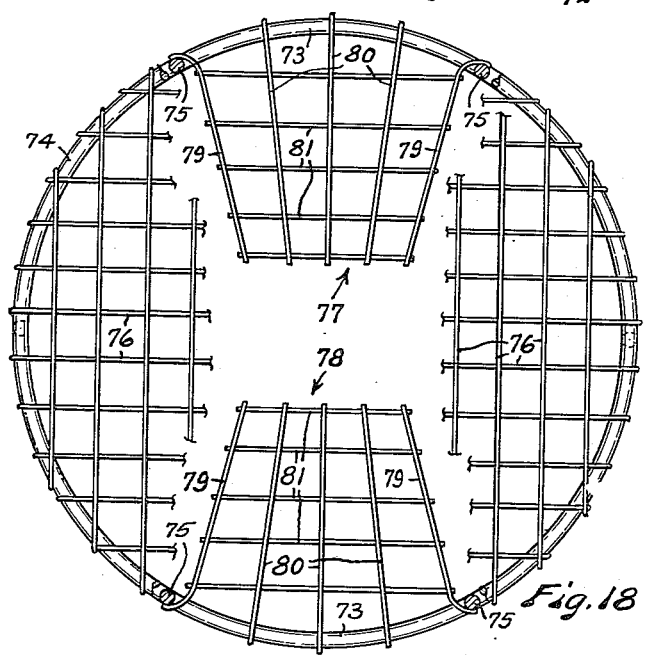
Fig. 18 is a plan view, with parts broken away and parts in section, showing a non-collapsible, circular or cylindrical trip provided with two entrance tunnels having runway or tunnel passageway floors constructed in accordance with this invention.
Figure 19:
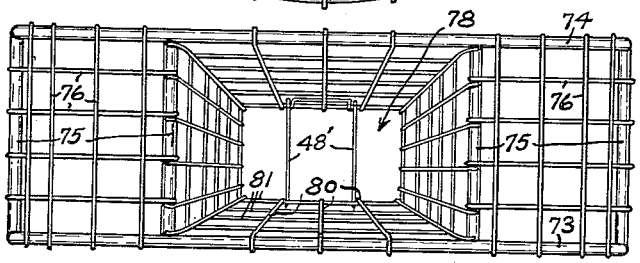
Fig. 19 is a side view of the circular trap shown in Fig. 18 looking into one of the tunnels.

Figs. 18 and 19 show a non-collapsible crab trap of circular or cylindrical shape. This trap comprises a frame formed of a bottom ring 73, a top ring 74, and a plurality of upright posts 75, all welded together with the posts 75 supporting the two rings 73 and 74 in spaced apart parallel relation. Two tunnels 77 and 78, similar to the tunnels 34 and 35 of the trap shown in Figs. 1 to 9 inclusive, except that they are not collapsible, are provided in the trap shown in Figs. 18 and 19. The runway floors of these two tunnels are shown in Fig. 18, and one complete tunnel 78 is shown in Fig. 19. The runway floor of each tunnel 77 and 78 comprises convergent side rods 79, together with intermediate longitudinal rods 80 and cross rods 81. The top and bottom and side walls of the trap shown in Figs. 18 and 19 are formed of rods 76 which preferably cross each other substantially at right angles. The trap shown in Figs. 18 and 19 operates in substantially the same manner as the trap disclosed in Figs. 1 to 9 inclusive except that it cannot be folded. A tunnel guard 48', Fig. 19, similar to previously described tunnel guard 48, is preferably provided at the inner end portion of each tunnel 77 and 78.

*Mode of operation*

The mode of operation of the trap for the most part has been set forth in conjunction with the description of the construction. This has been done in the interest of conciseness and clearness.

The drawings and text show clearly the function of the rods in combination with the angles formed by their disposition in providing a trap which overcomes the several detailed objections of the trap of common design and use.

The tunnel folding construction in combination with the folding construction of the frame of the trap as a whole operates to give a completely collapsible trap which greatly permits increasing the number of traps carried and lessens the danger of damage or loss from storm. Of course, the trap of a part of my invention, if desired, may be made omitting that part of my invention relating to the folding features.

The side and floor parts of the traps herein disclosed may be fabricated by welding together metal rods which rods or bars are of large enough diameter or cross-section so that the joint portions of the legs or claws of crabs will not become caught on them. I have found that rods of about one-eighth of an inch in diameter are very efficient and satisfactory both as to not entering the joints and being of sufficient stiffness as not to be distorted. These rods are positioned and arranged in such a manner as to avoid forming between them acute angles in which the appendages (legs or claws) of the crabs can become caught at the locations of the joints. The side and floor parts thus formed of fabricated rods are strong and will stand up and are not easily distorted or pulled out of shape as are parts formed of wire mesh or woven wire. The tunnels thus formed of fabricated rods are self-supporting as illustrated in Fig. 4, and the inner ends of the tunnels 34 and 35 of said Fig. 4 do not need to be connected together or supported from the top wall of the trap as do similar tunnels formed of ordinary woven wire. This minimizes obstructing the area adjacent the inner ends of the tunnels and helps to keep this area clear and lessens the tendency toward piling up of the crabs and blocking of the tunnels at this location.

Fabricating the side and floor parts of the trap from metal rods of substantial diameter and avoiding the formation of undesirably acute angles between the fabricated parts provides a trap into which the crabs can enter freely without getting their legs or claws caught.

Also, such arrangement or construction provides a trap of relatively unyielding mesh from which trap the crabs can be removed with much less danger of pulling off parts of the legs or claws in the process of emptying the trap. This construction increases the efficiency of the trap as respects the number of whole crabs it will catch. Also, this increases the value of the catch by reducing the number of culls, as any crab which has a leg or claw missing is classified as a "cull."

Obviously, changes may be made in the forms, dimensions and arrangement of the parts of my invention without departing from the principle thereof, the above setting forth only preferred forms of embodiment.

I claim:

1. A self-rigid trap for taking Crustacea of the order of Brachyura of the character described, comprising a frame having top and bottom face frame members and locking hinges mounted on each side of said frame holding said top and bottom frame members in spaced relation when locked and in collapsed relation when folded, said top and bottom frame members mounting reticulated side-forming panels secured on the periphery of said top and bottom frame members, said side-forming panels being medially divided and pivotally connected, at least one of said side-forming panels being provided with a tunnel opening, an inwardly directed tunnel passageway defined by converging upper and floor members and hinged side members mounted in said tunnel opening, said hinged side members permitting the tunnel to be collapsed when said top and bottom frame members are collapsed, said tunnel passageway members being formed of spaced, rigid rods arranged in mesh pattern with wide boundary enclosing angles in the direction of ingress, forming Crustacea supporting and Crustacea appendage contacting surfaces over which said Crustacea crawl upon entering the trap, such rods and boundary angles being of a size at least sufficient to avoid catching the said appendages of said Crustacea and avoid entrance of the rods into the joints of appendages of Crustacea while so crawling thereover, an inwardly swinging gate hingedly mounted in said tunnel passageway at the inner end thereof, said swinging gate being movable to open position by the Crustacea pressing against the same and closing the tunnel opening against attempted egress of said Crustacea from the trap, the reticulated panels forming the top, bottom, and side portions mounted on said frame and said tunnel passageway members presenting interstices of a size permitting Crustacea smaller than marketable size to escape.

2. A trap according to claim 1, wherein said Crustacea appendage contacting tunnel floor member comprises rigid floor rods provided with gussets at the points of intersection of said rods in the direction of ingress of said Crustacea.

3. A self-rigid trap for taking Crustacea of the order of Brachyura of the character described, comprising a rectangular frame having top and bottom face frame members and locking hinges mounted on each corner of said frame holding said top and bottom frame members in spaced relation when locked and in collapsed relation when folded, reticulated panels formed of substantially transversely disposed wire-like members mounted on said top and bottom frame members, reticulated side-forming panels secured on the periphery of said top and bottom frame members, said side-forming panels being medially divided and pivotally connected, at least one of said side-forming panels being provided with a tunnel opening, reticulated relatively converging upper members, floor members, and hinged side members mounted on said one side-forming panel to form an inwardly directed tunnel passageway, said hinged side members permitting the tunnel passageway to be collapsed when said top and bottom frame members are collapsed, said tunnel passageway members being formed of spaced, substantially transversely disposed rigid rods of about ⅛ inch diameter in providing a Crustacea supporting and Crustacea appendage contacting surfaces over which said Crustacea crawl upon entering the trap, which rod size and substantially transverse arrangement avoid catching the appendages of said Crustacea and avoid entrance of the rods into the joints of appendages of Crustacea while so crawling thereover, an inwardly swinging gate hingedly mounted in the inner end of said tunnel passageway, said swinging gate being of convex configuration in the direction of ingress of said Crustacea, said swinging gate being movable to open position by the Crustacea pressing against the same and closing the tunnel opening against attempted egress of said Crustacea from the trap, the reticulated panels forming the top, bottom, and side portions mounted on said frame and the tunnel passageway members presenting interstices of a size permitting Crustacea smaller than marketable size to escape.

4. A trap according to claim 3, wherein said Crustacea appendage contacting tunnel floor member is formed of substantially transversely disposed rigid rods having gussets disposed in corners located in the direction of ingress of said Crustacea in providing that all enclosed angles of said floor member structure are the order of not less than about 60° measuring convergingly in the direction of ingress, such stiff rods insuring that the reticulated form of said floor member will not be distorted by efforts of the Crustacea to escape, and said gusset filled corners thereby avoiding snagging of the appendages of said Crustacea and avoiding entry of such rod corners into joints of the Crustacea appendages while the Crustacea are crawling thereover.

References Cited in the file of this patent

UNITED STATES PATENTS

| Number | Name | Date |
| --- | --- | --- |
| 147,899 | Carnaham | Feb. 24, 1874 |
| 392,296 | Thomas | Nov. 6, 1888 |
| 693,391 | Holland | Feb. 18, 1902 |
| 764,085 | Walton | July 5, 1904 |
| 801,923 | Shepherd | Oct. 17, 1905 |
| 1,008,095 | Williams et al. | Nov. 7, 1911 |
| 1,010,256 | Harris | Nov. 28, 1911 |
| 1,076,623 | Bond | Oct. 21, 1913 |
| 1,146,698 | Franklin | July 13, 1915 |
| 1,234,629 | Clapp | July 24, 1917 |
| 1,474,508 | Benson | Nov. 20, 1923 |
| 1,607,443 | Cormier | Nov. 16, 1926 |
| 1,638,238 | Brautingam et al. | Aug. 9, 1927 |
| 1,704,948 | Maston | Mar. 12, 1929 |
| 2,119,828 | Nordenstam | June 7, 1938 |
| 2,162,623 | Livingston | June 13, 1939 |
| 2,578,172 | Burton | Dec. 11, 1951 |